United States Patent
Gurumoorthy et al.

(10) Patent No.: US 12,550,060 B2
(45) Date of Patent: *Feb. 10, 2026

(54) PAGING A USER EQUIPMENT IN IDLE OR INACTIVE STATE

(71) Applicant: Apple Inc., Cupertino, CA (US)

(72) Inventors: Sethuraman Gurumoorthy, San Ramon, CA (US); Fangli Xu, Beijing (CN); Haijing Hu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,340

(22) Filed: Apr. 15, 2024

(65) Prior Publication Data

US 2024/0276378 A1  Aug. 15, 2024

Related U.S. Application Data

(63) Continuation of application No. 17/593,739, filed as application No. PCT/CN2020/125079 on Oct. 30, 2020, now Pat. No. 12,022,391.

(51) Int. Cl.
*H04W 68/02* (2009.01)
*H04W 52/02* (2009.01)

(52) U.S. Cl.
CPC ....... *H04W 52/0229* (2013.01); *H04W 68/02* (2013.01)

(58) Field of Classification Search
CPC ............................. H04W 52/02; H04W 68/02
See application file for complete search history.

(56) References Cited

U.S. PATENT DOCUMENTS

| | | | |
|---|---|---|---|
| 2010/0002720 A1* | 1/2010 | Ji | H04W 52/0216 370/459 |
| 2018/0192436 A1 | 7/2018 | Yi et al. | |
| 2022/0124674 A1* | 4/2022 | Babaei | H04W 68/02 |

FOREIGN PATENT DOCUMENTS

| | | |
|---|---|---|
| CN | 110169156 | 8/2019 |
| CN | 110999438 | 4/2020 |
| CN | 111328461 | 6/2020 |
| WO | 2018/128933 | 7/2018 |
| WO | 2019/094494 | 5/2019 |
| WO | 2020/024278 | 2/2020 |

OTHER PUBLICATIONS

Vivo, "Paging enhancement in idle/inactive mode for power saving", 3GPP TSG-RAN WG2 Meeting #112-e, R2-2009083, Oct. 23, 2020, 8 sheets.

* cited by examiner

*Primary Examiner* — Michael T Vu
(74) *Attorney, Agent, or Firm* — Fay Kaplun & Marcin, LLP

(57) ABSTRACT

A user equipment (UE) is grouped into a paging subgroup for the purposes of receiving pages from a network. The UE receives, from the network, a paging configuration for a Radio Resource Control (RRC) idle state or an RRC inactive state paging operation, the paging configuration comprising a paging subgroup identification for the UE and monitors paging occasions based on at least the paging subgroup identification.

18 Claims, 4 Drawing Sheets

PAGING A USER EQUIPMENT IN IDLE OR INACTIVE STATE

BACKGROUND

A user equipment (UE) may be configured with a discontinuous reception cycle (DRX) when operating in an idle or inactive state. The DRX cycle includes a scheduled time window during which the UE monitors for network communications, e.g., paging. Outside of the scheduled time window, the UE may have the opportunity to sleep and conserve power. Under conventional circumstances, the UE monitors for pages during the scheduled time window and determine if any pages included in the scheduled time window are for the UE, e.g., the UE may monitor a page that is not intended for the UE. This is sometimes referred to as false paging, e.g., the UE will decode a page only to determine that the page is not intended for the UE. This is an inefficient use of the UE's limited power supply. Accordingly, there is a need for a mechanism that mitigates the inefficient power consumption associated with receiving pages while in the DRX cycle of the idle or inactive state.

SUMMARY

Some exemplary embodiments are related to a user equipment (UE) having a transceiver configured to communicate with a base station and a processor communicatively coupled with the transceiver and configured to perform operations. The operations include receiving, from the network, a paging configuration for a Radio Resource Control (RRC) idle state or an RRC inactive state paging operation, the paging configuration comprising a paging subgroup identification for the UE and monitoring paging occasions based on at least the paging subgroup identification.

Other exemplary embodiments are related to a processor of a user equipment (UE) configured to perform operations. The operations include receiving, from a network, a paging configuration for a Radio Resource Control (RRC) idle state or an RRC inactive state paging operation, the paging configuration comprising a paging subgroup identification for the UE and monitoring paging occasions based on at least the paging subgroup identification.

Still further exemplary embodiments are related to a processor of a network component of a network configured to perform operations. The operations include determining a paging configuration for a Radio Resource Control (RRC) idle state or an RRC inactive state paging operation for a user equipment (UE), the paging configuration comprising assigning a paging subgroup identification for the UE and sending, during a registration procedure performed between the UE and the network, the paging configuration to the UE.

Additional exemplary embodiments are related to a base station having a transceiver configured to communicate with a user equipment (UE) and a processor communicatively coupled with the transceiver and configured to perform operations. The operations include receiving a paging configuration for a Radio Resource Control (RRC) idle state or an RRC inactive state paging operation for the UE, the paging configuration comprising assigning a paging subgroup identification for the UE and transmitting, to the UE during a RRC connection release procedure performed between the UE and the base station, the paging configuration to the UE.

DETAILED DESCRIPTION

Figure 1:
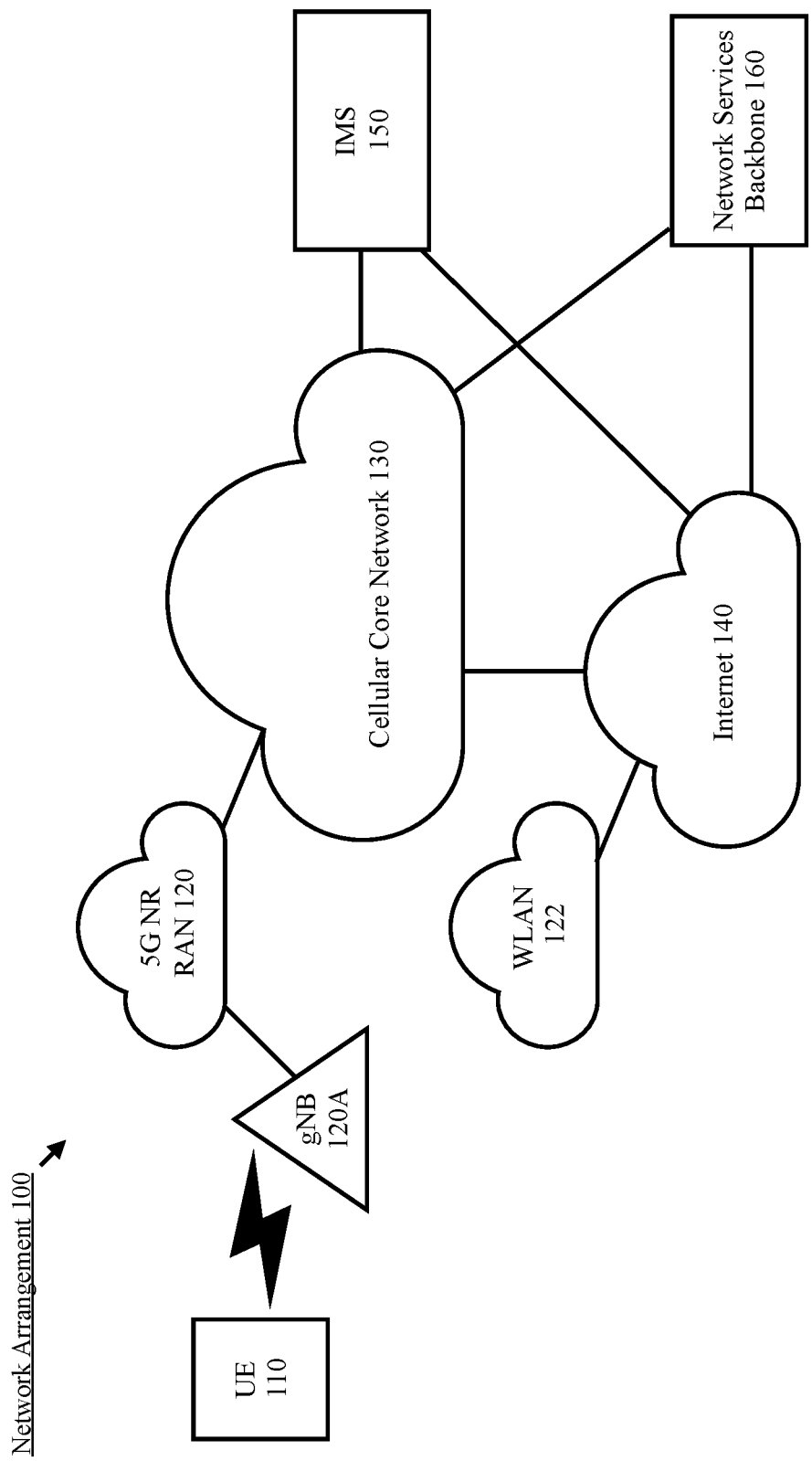
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to grouping a user equipment (UE) into one or more paging subgroups and the UE monitoring for paging while in the idle or inactive state based on the paging subgroup.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are described with reference to the network assigning a UE to a paging subgroup. This should be understood to mean that any portion of the cellular network may assign the UE to a paging subgroup. For example, the cellular core network (or any component and/or function thereof) may assign the UE to a paging subgroup. In another example, the Radio Access Network (RAN) (e.g., 5G NR-RAN) or any component thereof (e.g., gNB) may assign the UE to a paging subgroup.

The exemplary embodiments are also described with regard to the network being a fifth generation (5G) New Radio (NR) network. The 5G NR network and the UE may utilize a Discontinuous Reception (DRX) cycle. However, any reference to the 5G NR network is merely provided for illustrative purposes. The exemplary embodiments may apply to any type of network that implements any appropriate type of power saving cycle.

When the UE is in a Radio Resource Control (RRC) idle state or an RRC inactive state, the UE may be configured with a DRX cycle. Those skilled in the art will understand that the DRX cycle refers to power saving mechanisms that includes utilizing an active mode of data exchange processing and a sleep mode of inactivity. The UE may use the active mode of processing at defined intervals to perform scheduled operations. One of these operations may be to monitor for pages from the network. The time period that the UE may be scheduled to receive control channel information may be termed the OnDuration. The OnDuration relates to a duration over which the UE may wake up to receive the paging information. During a DRX cycle, when an OnDuration is not scheduled the UE may have an opportunity to utilize the sleep mode of inactivity and conserve power.

A DRX cycle may have a predetermined duration N such as 2.56 seconds, 1.28 seconds, 640 milliseconds (ms), 320 ms, 100 ms, 50 ms, 40 ms, 20 ms, etc. For example, at a time 0, there may be a OnDuration during which the active mode of processing is used. Subsequently, upon the conclusion of the OnDuration, the UE has an opportunity to utilize the sleep mode of inactivity. Then at a time N, there may be another OnDuration. Subsequently, the sleep mode is used until a time 2N. This process continues for the duration of the cycle. Reference to the sleep mode of inactivity does not necessarily mean putting the processor, the transmitter, and the receiver of the UE to sleep, in hibernation, or in deactivation. For example, the processor (e.g., baseband and/or application) may continue to execute other applications or processes. The sleep mode relates to conserving power by discontinuing a continuous processing functionality relating to operations that enable the UE to receive data that may be transmitted to the UE and transmit data to the network. Reference to the term to DRX cycle is for illustrative purposes, different networks may refer to similar concepts by a different name. Further, reference to the cycles being configured in ms units is merely for illustrative purposes, the exemplary embodiments may utilize a DRX cycle that is based on subframes or any other suitable unit of time.

In conventional networks, a UE will wake up during the OnDuration of the DRX mode and decode the Physical Downlink Control Channel (PDCCH). The PDCCH may include an indication that there is a paging message that is to be sent by the network. However, there may be many UEs that are using the same DRX cycle, thus the information related to paging in the PDCCH is not individual to one UE, but is intended to indicate to all UEs that have the same OnDuration that there is an incoming paging message. The Physical Downlink Shared Channel (PDSCH) includes the paging message that specifically identifies the UE for which the paging message is intended. Thus, all the UEs will then decode the search space of the PDSCH to determine the UE for which the paging message is intended. The UEs that the paging message is not intended have now decoded both the PDCCH and the PDSCH for no reason (e.g., false paging), thereby wasting resources.

The exemplary embodiments relate to grouping the UEs into paging subgroups and configuring the UEs with the paging subgroup information. Using this paging subgroup configuration information, the UEs may monitor the paging information from the network in a manner that saves resources, e.g., avoids false paging occurrences.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120 and a WLAN 122. However, it should be understood that the UE 110 may also communicate with other types of networks (e.g. 5G cloud RAN, LTE-RAN, legacy cellular network, WiFi, etc.) and the UE 110 may also communicate with networks over a wired connection. With regard to the exemplary embodiments, the UE 110 may establish a connection with the 5G NR RAN 120 and/or the WLAN 122. Therefore, the UE 110 may have a 5G NR chipset to communicate with the NR RAN 120 and an ISM chipset to communicate with the WLAN 122.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The base station (e.g., the gNB 120A) may include one or more communication interfaces to exchange data and/or information with camped UEs, the corresponding RAN, the cellular core network 130, the internet 140, etc. Further, the base station may include a processor configured to perform various operations. For example, the processor of the base station may be configured to perform operations related to the exemplary wake-up signaling described herein. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A). As mentioned above, the use of the 5G NR RAN 120 is for illustrative purposes and any type of network may be used. For example, the UE 110 may also connect to the LTE-RAN (not pictured) or the legacy RAN (not pictured).

In addition to the networks 120 and 122 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
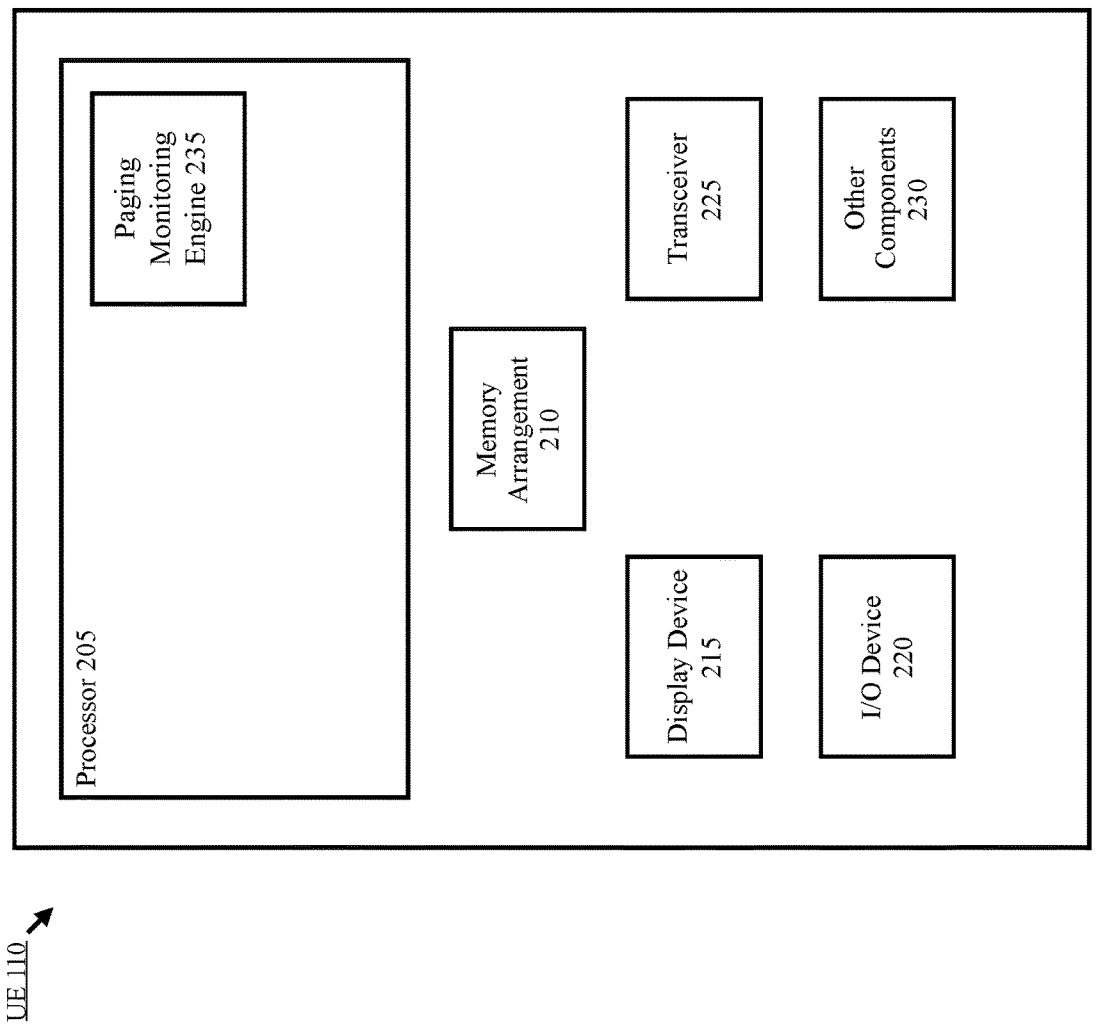
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a paging monitoring engine 235. The paging monitoring engine 235 may be configured to perform operations associated with monitoring for pages that are sent by the network. The paging monitoring may be based on a paging configuration of the UE 110 that includes a paging group configured by the network.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

When connected to the network, the UE 110 may be configured to be in one of a plurality of different operating states. One operating state may be characterized as RRC idle state and another operating state may be characterized as RRC connected state. RRC refers to the radio resource control (RRC) protocols. Those skilled in the art will understand that when the UE 110 is in an RRC connected state, the UE 110 and the network may be configured to exchange information and/or data. The exchange of information and/or data may allow the UE 110 to perform functionalities available via the network connection. Further, those skilled in the art will understand that when the UE 110 is connected to the network and in RRC idle state the UE 110 is generally not exchanging data with the network and radio resources are not being assigned to the UE 110 within the network. However, when the UE 110 is in RRC idle state, the UE 110 may monitor for information and/or data transmitted by the network (e.g., paging).

Another operating state may be characterized as RRC inactive state. In the RRC inactive state, the UE 110 maintains an RRC connection while minimizing signaling and power consumption. Similar to RRC idle state, when the UE 110 is connected to the network and in RRC inactive state the UE 110 is generally not exchanging data with the network. When the UE 110 is in RRC inactive state, the UE 110 may still monitor for information and/or data transmitted by the network (e.g., paging). However, any reference to RRC connected state, RRC idle state and RRC inactive state is merely provided for illustrative purposes, the exemplary embodiments may apply to any suitable operating state for the UE 110.

When the UE 110 is camped on a cell and in an RRC idle state or an RRC inactive state, the UE 110 may not be able to exchange data with the network. To exchange data with the network the UE 110 may transition from the RRC idle state to the RRC connected state. For example, while in RRC idle state or inactive state the UE 110 may listen for information such as paging messages. In response, the UE 110 may issue a request to the network that indicates that the UE 110 wants to be moved to the RRC connected state. A successful transition from the RRC idle state or RRC inactive state to RRC connected state may include the exchange of messages between the UE 110 and the cell of the network. In the RRC connected state, a network context may be established between the cell of first network and the UE 110. Thus, the UE 110 may be assigned radio resources and the UE 110 may be able to exchange data with the network.

When in RRC idle state or RRC inactive state, the UE 110 may be configured with a DRX cycle. As indicated above, the DRX cycle may include an OnDuration during which the UE 110 may monitor for network communications. The exemplary embodiments reduce the power consumption associated with waking up to monitor for paging information by grouping UEs into paging subgroups that may be used to control the UE 110 paging monitoring behavior.

Figure 3:
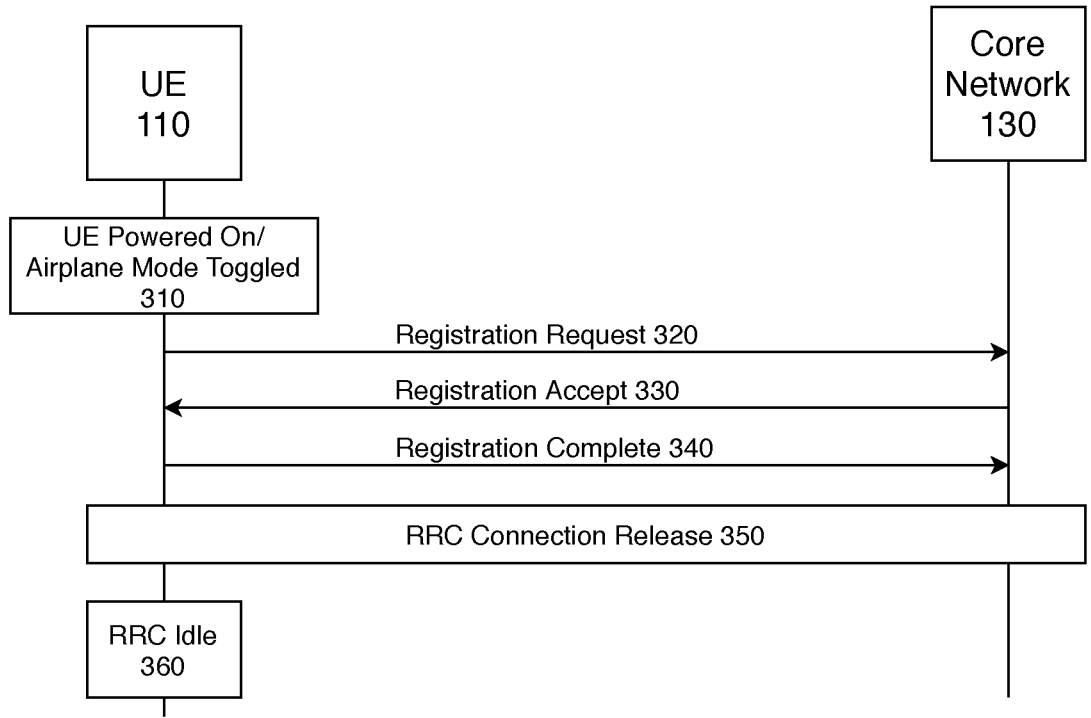
FIG. 3 shows an exemplary signaling diagram illustrating a core network configuring a UE with paging subgroup information according to various exemplary embodiments.
Figure 4:
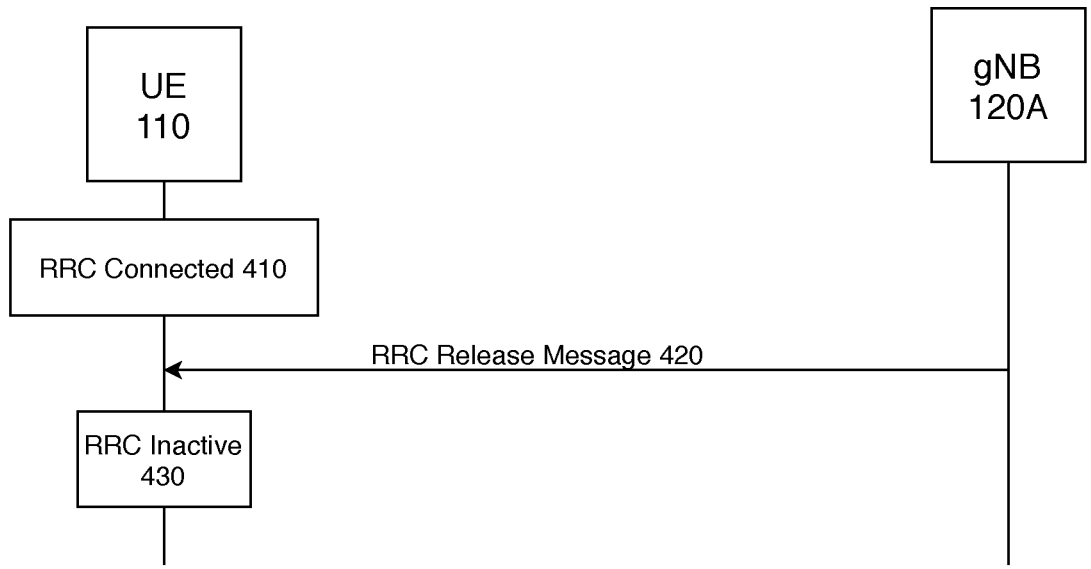
FIG. 4 shows an exemplary signaling diagram illustrating a next generation Node B (gNB) configuring a UE with paging subgroup information according to various exemplary embodiments.

FIG. 3 provides an example of non-access stratum (NAS) signaling to provide the UE 110 with configuration information that includes paging subgroup information. FIG. 4 provides an example of access stratum (AS) signaling to provide the UE 110 with configuration information that includes paging subgroup information. Once the UE 110 is configured with the paging subgroup information, it will then be described how the UE 110 uses this configuration information to monitor for paging messages from the network.

As described above, in conventional networks, all UEs having the same DRX cycle timing will monitor for pages. As will be described in greater detail below, in the exemplary embodiments, the use of paging subgroups may limit the number of UEs that need to wakeup to monitor a paging occasion during the DRX cycle. The greater the number of paging subgroups, the greater number of UEs that may not need to wakeup during any individual OnDuration of a DRX cycle. However, the number of paging subgroups and the number of UEs assigned to each paging subgroup may be varied in the exemplary embodiments as there is no set number of paging subgroups.

FIG. 3 shows an exemplary signaling diagram 300 illustrating the core network 130 configuring the UE 110 with paging subgroup information according to various exemplary embodiments. In the example of FIG. 3, the signaling is shown as being between the UE 110 and the core network 130. Those skilled in the art will understand that the signaling will traverse other components, e.g., the gNB 120A, the 5G NR-RAN 120, etc.

In 310, the UE 110 is powered on or the airplane mode is toggled off. In response to these operations, the UE 110 will perform various actions including scanning for available networks. As part of the system information (SI), a network may indicate (e.g., via a broadcast of a System Information Block (SIB)) whether the network supports paging subgroups. The UE 110 may use this information to determine whether a particular network is a candidate network for which the UE 110 wants to register. It should also be understood that the network may enable or disable the sub-grouping functionality via a SI change procedure, e.g., there may be situations where the paging subgroup functionality is not as useful such as when there are very few UEs connected to a particular cell.

When the UE 110 identifies a suitable network, the UE 110 will send a registration request 320 to the core network 130. Those skilled in the art will understand that any suitable registration procedure may be used for the UE 110 to register with the core network 130 and the messages described herein may be considered to be generic versions of messages that are used in registration procedures, e.g., the actual number of and name of the messages may vary according to the registration procedure for the specific network or type of network.

If the core network 130 accepts the registration request 320, the core network 130 will send a registration accept message 330 to the UE 110. The registration accept message 330 may include paging subgroup information for the UE 110, e.g., the paging subgroup to which the UE 110 has been assigned by the core network 130. The paging subgroup information may include a unique paging subgroup ID for the paging subgroup to which the UE 110 is assigned. In some exemplary embodiments, the subgroup IDs may be a static set based on the criteria by which the UEs are grouped. In other exemplary embodiments, a set of dynamic subgroup IDs may be reserved. In these embodiments, the network may allocate the subgroup IDs as needed depending on the criteria used to group the UEs and/or to evenly distribute the UEs in the different paging subgroups. The various manners or criteria of assigning a UE 110 to a paging subgroup will be described in greater detail below.

The UE 110 may then send a registration complete message 340. At the completion of 340, the UE 110 will be configured with the paging subgroup information that the UE 110 may use for monitoring pages from the network. At a later time, the UE 110 and the core network 130 will perform an RRC Connection Release procedure 350 that transitions the UE 110 from the RRC Connected state to the RRC Idle (or Inactive) state 360. As described above, when in the Idle state 360, the UE 110 may enter a DRX cycle. When in the DRX cycle, the UE 110 may monitor for network pages based on the paging configuration received in the registration accept message 330. Examples of paging monitoring will be described in greater detail below.

FIG. 4 shows an exemplary signaling diagram 400 illustrating the gNB 120A configuring the UE 110 with paging subgroup information according to various exemplary embodiments. In the example of FIG. 4, the signaling is shown as being between the UE 110 and the gNB 120A. However, it should be understood that the paging subgroup information for the UE 110 may be determined by any of the core network 130, the 5G NR-RAN 120 or the gNB 120A.

Initially, it may be considered that the UE 110 is in an RRC Connected state 410. At a later time, the UE 110 and the network will perform an RRC Connection Release procedure to transition the UE 110 to the RRC Inactive (or Idle) state. The procedure will include the gNB 120A sending an RRC Connection Release message 420, which may include paging subgroup information for the UE 110, e.g., the paging subgroup to which the UE 110 has been assigned. Thus, at the completion of the RRC Connection Release procedure, the UE 110 will be configured with the paging subgroup information that the UE 110 may use for monitoring pages from the network when the UE 110 is operating in the RRC Inactive state 430.

As described above, the network may assign the UE 110 to a paging subgroup based on any number of criteria. For example, the network may assign the UE 110 to a subgroup based on the UE identification (UE_ID) (e.g., based on whether the last digit of the UE_ID is even/odd, based on a range of UE_IDs, etc.), a network slice the UE 110 intends to use, a network configurable parameter that indicates the maximum number of subgroups, a type of paging the UE is interested in monitoring (e.g., RAN paging, core network paging), a type of access (e.g., 3GPP, non-3GPP), a type of service the UE intends to use (e.g., voice, data, streaming, etc.), a mobility state of the device, etc. From these examples it should be seen that the network may use a variety of criteria to assign the UE 110 to a paging subgroup and this list should not be considered to be exhaustive.

As described above, the subgroup IDs with which the UE 110 may be configured may be a static set corresponding to the criteria. To provide a simple example, if the only criteria for grouping the UEs was based on the last digit of the UE_ID being even/odd, there would only be two (2) paging subgroups, e.g., the even digit paging subgroup and the odd digit paging subgroup. In this example, the network may configure a static set of two (2) subgroup IDs to configure UEs with depending on the paging subgroup into which the UEs are assigned. As described above, the static number of subgroup IDs is only one example of how the network may assign subgroup IDs.

In some exemplary embodiments, these criteria may be assigned a priority with some criteria taking priority over other criteria when assigning the UE 110 to a paging subgroup. In other exemplary embodiments, the network may balance the number of UEs in a paging subgroups based on the criteria. For example, the network may determine that a particular paging subgroup has too many members based on one of the criteria. The network may review the other criteria of the UEs with respect to the particular paging subgroup and assign the UEs to different paging subgroups based on the other criteria to balance the UEs across subgroups. Thus, the priority of the different criteria may be statically defined or may also be dynamically changeable based on, for example, network policies, loading or any other condition.

As described above, the paging monitoring by the UE 110 may be based on the paging configuration information that the UE receives, e.g., the paging subgroup information. In some exemplary embodiments, the subgroups may be based on a Paging—Radio Network Temporary Identification (P-RNTI). For example, the network may configure different sets of P-RNTIs. Each UE may be assigned one of the P-RNTIs and then be assigned to a paging subgroup for the assigned P-RNTI. In these exemplary embodiments, the UE 110 may be configured with a P-RNTI and a corresponding paging subgroup. Thus, when the UE 110 wakes up and monitors the paging PDCCH, the UE 110 can ignore any paging information that is destined for a different paging subgroup.

In other exemplary embodiments, paging messages may be delivered on different time and/or frequency resources for each paging subgroup. For example, as part of the configuration information, the UE 110 may be assigned to a paging subgroup and may also receive information indicating the time and/or frequency resources on which paging message for the assigned paging subgroup will be sent by the network. In this manner, the UE 110 only needs to monitor the configured time and/or frequency resources for paging messages rather than an entire search space.

In further exemplary embodiments, a paging indication for UE subgroups may be sent using paging Downlink Control Information (DCI). As those skilled in the art will understand, paging DCI may be sent as part of the PDCCH. The UE 110 may decode the DCI and determine if the DCI indicates that there are paging messages for the assigned paging subgroup. If the DCI does not include any information regarding paging for the assigned paging subgroup for the UE 110, the UE 110 may skip decoding the PDSCH that includes the actual paging messages.

In still further exemplary embodiments, the UE 110 may monitor for a paging indication using Paging Early Indication (PEI) or Wakeup Signal (WUS) for UE subgroups. The following description will use the term WUS to describe the paging monitoring operations. However, the exemplary embodiments apply equally to a PEI. As will be described in greater detail below, the WUS may include an indication of the paging subgroup associated with the WUS. Thus, when the UE 110 decodes the WUS, the UE 110 will understand if the WUS indicates that a page is destined for the paging subgroup to which the UE 110 is assigned.

Figure 5:
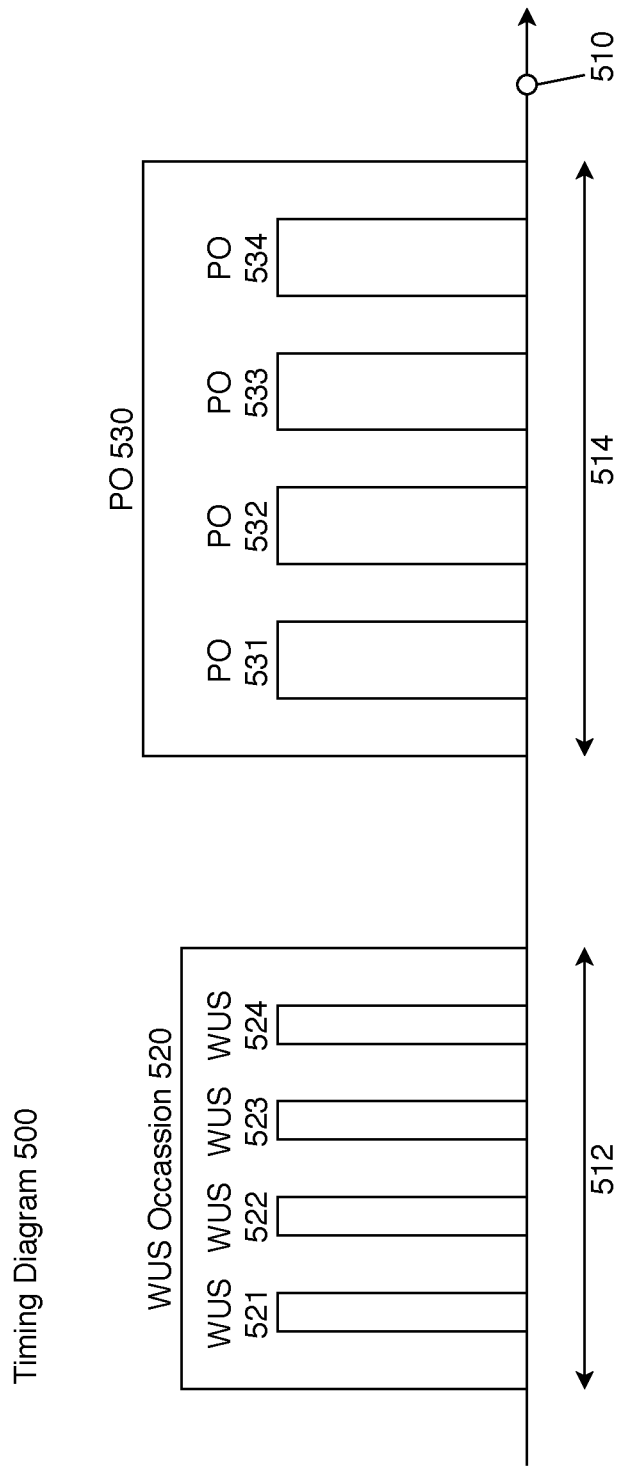
FIG. 5 shows an exemplary timing diagram for wakeup (WUS) occasions comprising paging subgroup information according to various exemplary embodiments.

FIG. 5 shows an exemplary timing diagram 500 for WUS occasions comprising paging subgroup information according to various exemplary embodiments. The timing diagram 500 provides a general overview of how wake-up signaling may be used in conjunction with a paging mechanism. The timing diagram 500 describes an example with four paging subgroups and it should be understood that this is only exemplary as any number of paging subgroups may be configured.

The timing diagram 500 includes a line 510 that represents time. Initially, consider a scenario in which the UE 110 is camped on the gNB 120A and operating in an RRC idle or RRC inactive state. During a first time duration 512, a WUS occasion 520 is scheduled. In this example, the WUS occasion 520 includes four WUS signals 521-524. As will be described in greater detail below, the WUS signals 521-524 each include paging subgroup information, e.g., each WUS signal 521-524 corresponds to a paging subgroup.

In the timing diagram 500, there is also a paging occasion 530 that corresponds to the WUS occasion 520. The paging occasion 530 includes individual paging occasions 531-534 corresponding to a paging subgroup. In this example, it may be considered that the WUS signal 521 corresponds to the paging occasion 531, the WUS signal 522 corresponds to the paging occasion 532, the WUS signal 523 corresponds to the paging occasion 533 and the WUS signal 524 corresponds to the paging occasion 534. Thus, in this example, the WUS signals correspond to the paging occasions in a time order. However, it should be understood that there is no requirement that the WUS signals and the paging occasions are in this order. The WUS occasion 520 (and each WUS signal 521-524) may have a predefined offset in time from the corresponding paging occasion 530 (and individual paging occasions 531-534). The offset may be configured in terms of time (e.g., milliseconds) or in units of slots, symbols, etc.

In some exemplary embodiments, the UE 110 may report a preferred WUS offset to the network.

It should be understood that the WUS occasion 520 is an occasion in which the WUS signals 521-524 may be sent. There is no requirement that all or any of the WUS signals 521-524 be sent during the WUS occasion 520. For example, if the network does not have a page for one or more of the paging subgroups corresponding to the WUS signals 521-524, the WUS signal corresponding to these one or more paging subgroups will not be sent. Similarly, the paging occasions 531-534 are occasions where paging messages may be sent. If there are no pages for one or more of the paging subgroups corresponding to the paging occasions 531-534, no paging messages will be sent during the corresponding paging occasion.

As described above, each WUS signal 521-524 and each WUS occasion 531-534 correspond to one paging subgroup. In this example, the UE 110 may be configured with the paging subgroup information that includes the WUS occasion that the UE 110 is to monitor. For example, it may be considered that the UE 110 is configured to be in the paging subgroup corresponding to the WUS signal 521 and paging occasion 531. Thus, the UE 110 is configured to monitor for the WUS 521 during the WUS occasion 520. When the WUS 521 is decoded, it may include a one or more bits indicating that there is a paging message for the UEs in the paging subgroup corresponding to the WUS signal 521 and paging occasion 531. If there is information indicating there is a paging message for the paging subgroup in the WUS signal 521, the UE 110 may then wakeup during the paging occasion 530 and monitor the paging occasion corresponding to the WUS signal 521, e.g., paging occasion 531 for paging information, that may then be used to decode the paging message that is transmitted on the PDSCH. If there is no information indicating there is a paging message for the paging subgroup in the WUS signal 521, the UE 110 may skip monitoring the paging occasion 530 because there is no paging messages for the UEs in the paging subgroup to which the UE 110 belongs.

In the above exemplary embodiments, there was a WUS corresponding to each paging subgroup. In other exemplary embodiments, the WUS may include information that identifies one or more of the paging subgroups. In these embodiments, UEs from all subgroups may monitor the WUS and only the UEs that identify paging subgroup information corresponding to their paging subgroups in the WUS may then monitor the corresponding paging occasions for the paging subgroup.

In some exemplary embodiments, the network may include a default fallback paging occasion in case a UE misses decoding a WUS for paging occasion corresponding to its assigned paging subgroup. The network may configure a pre-assigned default paging subgroup ID which the UEs can monitor. To provide a specific example, consider the example started above where the UE 110 has been configured to monitor the WUS signal 521 that corresponds to the paging occasion 531 for the paging subgroup to which the UE 110 is assigned. It may then be considered that the UE 110 missed decoding the WUS signal 521 for any of a variety of different reasons. However, in the example of FIG. 5, it may be considered that the WUS signal 524 and the corresponding paging occasion 534 are the default paging occasion. Thus, the UE 110 may monitor the WUS signal 524 to see if any pages are included in the paging occasion 534 and then decode the paging occasion 534 if there are any paging messages. The UE would know that monitoring such default subgroup would result in higher probability of false paging reception but it would avoid a missed page.

In some exemplary embodiments, the UE may fallback to legacy non subgrouping based paging occasion monitoring without any subgrouping. The network may configure whether the UE behavior is the default paging subgroup ID as described above or the legacy paging behavior.

In some exemplary embodiments, the UE may advertise whether it supports paging subgroups. If the capability is not supported, the network may fallback to the legacy paging design, e.g., the network may broadcast a set of default paging occasions for the UE. The network may also dynamically enable or disable subgrouping for a particular UE as part of dedicated signaling (e.g. RRC Release signaling.)

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry configured to:
   process, based on signals received from a network, information indicating a network cell supports paging early identification (PEI) and paging subgroups;
   determine whether a core network (CN) assigned subgroup has been assigned or information for determining a user equipment identification (UE_ID) subgroup has been received;
   when the information for determining the UE_ID subgroup has been received, determine the UE_ID subgroup based on the information for determining the UE_ID subgroup; and
   when the CN assigned subgroup has not been assigned and the information for determining the UE_ID subgroup has not been received, monitor paging occasions (POs) during an active state of a discontinuous reception cycle (DRX) for a Radio Resource Control (RRC) idle state or an RRC inactive state.

2. The apparatus of claim 1, wherein the information comprises a number of subgroups for UE_ID based subgrouping in a paging occasion (PO).

3. The apparatus of claim 2, wherein the information is broadcast in a system information block (SIB).

4. The apparatus of claim 2, wherein the information further comprises a UE identification assigned by the network.

5. The apparatus of claim 1, wherein the processing circuitry is further configured to:
   monitor a PEI corresponding to the UE_ID subgroup; and
   determine whether the PEI includes information indicating a paging occasion (PO) corresponding to the PEI includes paging information for the UE_ID subgroup.

6. The apparatus of claim 5, wherein the processing circuitry is further configured to:
   when the PEI includes paging information for the UE_ID subgroup, monitor the PO corresponding to the PEI during the active state of the DRX for the RRC idle state or RRC inactive state.

7. The apparatus of claim 5, wherein the processing circuitry is further configured to:
   when the PEI does not include paging information for the UE_ID subgroup, skip monitoring the PO corresponding to the PEI during the active state of the DRX for the RRC idle state or RRC inactive state.

8. A user equipment (UE), comprising:
   a transceiver configured to communicate with a network; and
   a processor communicatively coupled to the transceiver and configured to:
   process, based on signals received from the network, information indicating a network cell supports paging early identification (PEI) and paging subgroups;
   determine whether a core network (CN) assigned subgroup has been assigned to the UE or information for determining a user equipment identification (UE_ID) subgroup has been received;
   when the information for determining the UE_ID subgroup has been received, determine the UE_ID subgroup based on the information for determining the UE_ID subgroup; and
   when the CN assigned subgroup has not been assigned and the information for determining the UE_ID subgroup has not been received, monitor paging occasions (POs) during an active state of a discontinuous reception cycle (DRX) for a Radio Resource Control (RRC) idle state or an RRC inactive state.

9. The UE of claim 8, wherein the information comprises a number of subgroups for UE_ID based subgrouping in a paging occasion (PO).

10. The UE of claim 9, wherein the information is broadcast in a system information block (SIB).

11. The UE of claim 9, wherein the information further comprises a UE identification assigned by the network.

12. The UE of claim 8, wherein the processor is further configured to:
    monitor a PEI corresponding to the UE_ID subgroup; and
    determine whether the PEI includes information indicating a paging occasion (PO) corresponding to the PEI includes paging information for the UE_ID subgroup.

13. The UE of claim 12, wherein the processor is further configured to:

when the PEI includes paging information for the UE_ID subgroup, monitor the PO corresponding to the PEI during the active state of the DRX for the RRC idle state or RRC inactive state.

14. The UE of claim 12, wherein the processor is further configured to:
when the PEI does not include paging information for the UE_ID subgroup, skip monitoring the PO corresponding to the PEI during the active state of the DRX for the RRC idle state or RRC inactive state.

15. A method, comprising:
receiving information indicating a network cell supports paging early identification (PEI) and paging subgroups;
determining whether a core network (CN) assigned subgroup has been assigned to a user equipment (UE) or information for determining a user equipment identification (UE_ID) subgroup has been received;
when the information for determining the UE_ID subgroup has been received, determine the UE_ID subgroup based on the information for determining the UE_ID subgroup; and
when the CN assigned subgroup has not been assigned and the information for determining the UE_ID subgroup has not been received, monitoring paging occasions (POs) during an active state of a discontinuous reception cycle (DRX) for a Radio Resource Control (RRC) idle state or an RRC inactive state.

16. The method of claim 15, further comprising:
monitoring a PEI corresponding to the UE_ID subgroup; and
determining whether the PEI includes information indicating a paging occasion (PO) corresponding to the PEI includes paging information for the UE_ID subgroup.

17. The method of claim 16, further comprising:
when the PEI includes paging information for the UE_ID subgroup, monitoring the PO corresponding to the PEI during the active state of the DRX for the RRC idle state or RRC inactive state.

18. The method of claim 16, further comprising:
when the PEI does not include paging information for the UE_ID subgroup, skipping monitoring the PO corresponding to the PEI during the active state of the DRX for the RRC idle state or RRC inactive state.

* * * * *